(No Model.)
F. P. MUSSER.
THILL COUPLING.
No. 293,906. Patented Feb. 19, 1884.
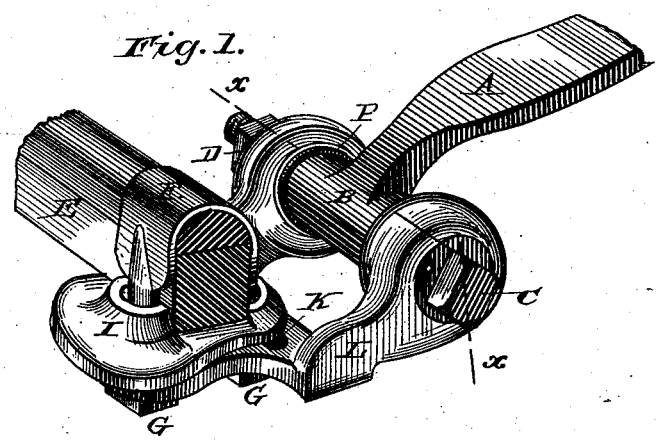
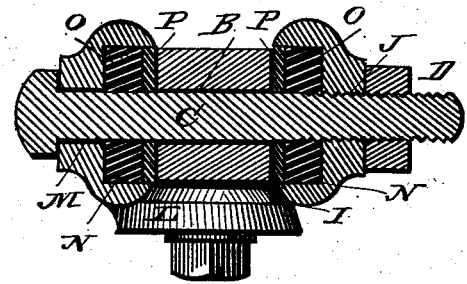
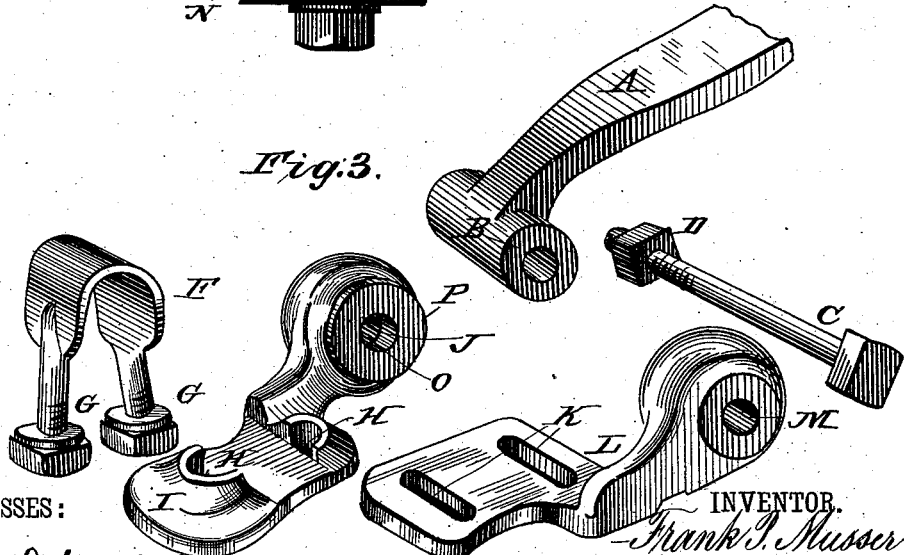
WITNESSES:
INVENTOR.
Frank P. Musser
By Louis Bagger & Co.
ATTORNEYS.

UNITED STATES PATENT OFFICE.

FRANK. P. MUSSER, OF BEAVER FALLS, PENNSYLVANIA.

THILL-COUPLING.

SPECIFICATION forming part of Letters Patent No. 293,906, dated February 19, 1884.

Application filed December 15, 1883. (No model.)

*To all whom it may concern:*

Be it known that I, FRANK. P. MUSSER, a citizen of the United States, and a resident of Beaver Falls, in the county of Beaver and State of Pennsylvania, have invented certain new and useful Improvements in Thill-Couplings; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved thill-coupling. Fig. 2 is a vertical section through the eye of the thill-iron and through the coupling-eyes on line $x\ x$, Fig. 1; and Fig. 3 is a perspective view of the several parts of the coupling separated.

Similar letters of reference indicate corresponding parts in all the figures.

My invention has relation to that class of thill-couplings in which the bearings through which the coupling-bolts pass are formed by the forward ends of two shackles secured adjustably upon the ends of a clip upon the axle; and it consists in the detailed construction and combination of parts of the same, as hereinafter more fully described and claimed.

In the accompanying drawings, the letter A indicates the thill-iron, the rear end of which forms an eye, B, of the usual shape, for the reception of the coupling-bolt C, which is provided with a nut, D.

E is the axle of the vehicle, and F is a clip, the ends of which are screw-threaded and provided with nuts G. These lower screw-threaded ends of the clip pass through two perforations, H, in a shackle, I, the forward end of which forms a perforated female-threaded bearing, J, and pass thereupon through two transverse slots, K, in a shackle, L, the forward end of which forms a perforated bearing, M, through which bearings the coupling-bolt passes, its screw-threaded end fitting into the threaded bearing, drawing the two bearings together, bearing against the ends of the eye of the thill-iron, which turns upon the bolt. The nuts upon the ends of the clip bear against the under side of the lower shackle, adjusting it in its position, the slots in the shackle allowing it to be moved laterally, clamping the ends of the eye of the thill-iron more or less hard, as desired. The inner sides of the bearings at the forward ends of the shackles are recessed at N, and perforated blocks O, of rubber or similar elastic and yielding material, are inserted into these recesses, and are provided at their outer sides with washers P, of leather, which prevent the ends of the eye of the thill-iron from wearing upon the rubber. It will now be seen that in this manner the eye of the thill-iron may be clamped perfectly tight, preventing it from rattling if the said eye or the coupling-bolt become worn, the bolt turning in the perforated bearing and having the nut serving to draw the ends of the shackles together, and the nuts upon the ends of the clip serving also to adjust the shackles in such a position as to clamp the ends of the eye of the thill-iron firmly between the perforated bearings lined with the yielding blocks.

I am aware that thill-couplings have been made in which the bearings for the coupling-bolt are formed in the forward ends of two shackles, secured upon the lower ends of a clip upon the axle, and I do not wish to claim such construction, broadly; but

What I claim, and desire to secure by Letters Patent of the United States, is—

The combination of the axle, the clip having nuts upon its threaded ends, the upper shackle having forwardly-projecting perforated and female-threaded recessed bearing, the lower shackle having transverse slots and perforated and recessed forwardly-projecting bearing, the perforated rubber blocks, the leather washers, the thill-iron forming the eye, and the coupling-bolt having the nut upon its threaded end, all constructed to operate as and for the purpose shown and set forth.

In testimony that I claim the foregoing as my own I have hereunto affixed my signature in presence of two witnesses.

FRANK. P. MUSSER.

Witnesses:
LOUIS SUTTER,
DAVID L. CALHOON.